(12) United States Patent
Hara (10) Patent No.: US 11,499,695 B2
(45) Date of Patent: Nov. 15, 2022

(54) OPTICAL MEMBER AND LIGHT EMISSION DEVICE

(71) Applicant: NICHIA CORPORATION, Anan (JP)

(72) Inventor: Akinori Hara, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/355,942

(22) Filed: Jun. 23, 2021

(65) Prior Publication Data

US 2021/0317969 A1   Oct. 14, 2021

Related U.S. Application Data

(63) Continuation of application No. 16/999,476, filed on Aug. 21, 2020, now Pat. No. 11,073,254.

(30) Foreign Application Priority Data

Aug. 22, 2019  (JP) .............................. JP2019-151840

(51) Int. Cl.
| F21V 17/10 | (2006.01) |
|---|---|
| F21V 5/00 | (2018.01) |
| F21V 9/30 | (2018.01) |
| F21V 29/76 | (2015.01) |
| F21K 9/64 | (2016.01) |
| F21Y 105/10 | (2016.01) |
| F21Y 115/30 | (2016.01) |

(52) U.S. Cl.
CPC ............... *F21V 5/007* (2013.01); *F21K 9/64* (2016.08); *F21V 9/30* (2018.02); *F21V 17/10* (2013.01); *F21V 17/101* (2013.01); *F21V 29/76* (2015.01); *F21Y 2105/10* (2016.08); *F21Y 2115/30* (2016.08)

(58) Field of Classification Search
CPC ........... F21V 9/30; F21V 17/10; F21V 17/101
See application file for complete search history.

(56) References Cited

U.S. PATENT DOCUMENTS

| 11,231,162 | B2 * | 1/2022 | Niki ......................... H05K 1/18 |
|---|---|---|---|
| 2013/0170220 | A1 | 7/2013 | Bueeler et al. |
| 2015/0077972 | A1 * | 3/2015 | Sugiyama ............... F21V 13/14 |
| | | | 362/553 |
| 2020/0012019 | A1 | 1/2020 | Fukakusa |

FOREIGN PATENT DOCUMENTS

| JP | 2007-067271 A | 3/2007 |
|---|---|---|
| JP | 2007-240648 A | 9/2007 |
| JP | 2010-165834 A | 7/2010 |
| JP | 2017-138566 A | 8/2017 |
| JP | 2018-106814 A | 7/2018 |
| WO | WO-2018/180950 A1 | 10/2018 |

OTHER PUBLICATIONS

Notice of Allowance on U.S. Appl. No. 16/999,476 dated Mar. 24, 2021.

* cited by examiner

*Primary Examiner* — Robert J May
(74) *Attorney, Agent, or Firm* — Foley & Lardner LLP (57) ABSTRACT

An optical member includes: a body portion having a first upper surface, and a second upper surface that is located above the first upper surface and surrounds the first upper surface in a plan view; a phosphor member disposed on the first upper surface; and a hold-down portion configured to secure the phosphor member such that the phosphor member is interposed between the hold-down portion and the body portion.

19 Claims, 11 Drawing Sheets

OPTICAL MEMBER AND LIGHT EMISSION DEVICE

CROSS-REFERENCE TO RELATED APPLICATIONS

This application is a continuation of U.S. patent application Ser. No. 16/999,476, filed on Aug. 21, 2020, which claims priority to Japanese Patent Application No. 2019-151840, filed on Aug. 22, 2019, the entire contents of which are hereby incorporated by reference their entireties.

BACKGROUND

The present disclosure relates to a light emission device.

Japanese Patent Publication No. 2007-67271 discloses a multiplex laser module of pigtail type. This laser module includes: a laser unit including a laser package in which a plurality of laser devices are hermetically sealed; a converging optics unit including a condenser lens to converge outgoing light from the laser package; and an optical fiber unit including an optical fiber on which light that has been converged by the converging optics unit is incident.

In the device disclosed in Japanese Patent Publication No. 2007-67271 and like devices, usually, the condenser lens is secured in a lens holder by means of an adhesion layer or the like. In turn, the lens holder is secured to a component for retaining a target of irradiation, e.g., a housing of the converging optics unit or the like.

SUMMARY

The distance from the condenser lens to the target of irradiation is an important factor that determines the shape and size of a light spot that is created on a light incident surface of the target of irradiation.

On the other hand, there may be cases in which it is difficult to control the shape and size of a light spot to be created on the light incident surface of the target of irradiation with a high accuracy.

A light emission device is needed that is capable of controlling the shape and size of a light spot to be created on a light incident surface of a target of irradiation with a high accuracy.

In one embodiment, light emission device according to the present disclosure includes: a collimated light source; a planoconvex lens having a flat surface and a convex curved surface, the planoconvex lens being configured to converge collimated light that is emitted from the collimated light source to form a convergent beam; an optical member configured to be irradiated with the convergent beam; and a housing in which the planoconvex lens is housed. The housing includes a lid configured to support the optical member, the lid having a through hole for allowing the convergent beam to pass through. The lid is in contact with at least a portion of the flat surface of the planoconvex lens.

Certain embodiments of the present disclosure provide a light emission device that is capable of controlling the shape and size of a light spot to be created on a light incident surface of a target of irradiation with high accuracy.

DETAILED DESCRIPTION

A condenser lens is usually employed in irradiating a small predetermined region of an object surface or a light incident surface with light that is emitted from a light-emitting element. A condenser lens is a lens functioning to allow a bundle of rays (hereinafter also referred to as a "light beam"), which is incident in a direction parallel to the optical axis of the lens, to be converged at the position of a rear side focal point. At or near the position of the rear side focal point, the light incident surface of any of a variety of targets of irradiation may exist, e.g., a phosphor, an end face of an optical fiber, or an object to be processed, for example. A convergent beam that has attained an increased energy density by having its beam diameter reduced through the condenser lens may be employed in exciting a phosphor, propagation and pumping within an optical fiber, heating and processing of an object to be processed, and so on.

In the past, difficulty in controlling the shape and size of a light spot to be created on a light incident surface of a target of irradiation with a high accuracy has been ascribed to a plurality of factors of variation. Namely, these factors of variation concern conventional structures for defining the distance from a condenser lens to the light incident surface of a target of irradiation, including, for example, misalignments in attaching a condenser lens to a lens holder, misalignments in attaching the lens holder to a housing or the like, dimensional errors in the lens holder and housing, and the like. Such problems can be solved with a light emission device according to certain embodiments of the present disclosure.

First, with reference to FIG. 1A and FIG. 1B, an example of a basic configuration of a light emission device according to the present disclosure will be described.

Figure 1A:
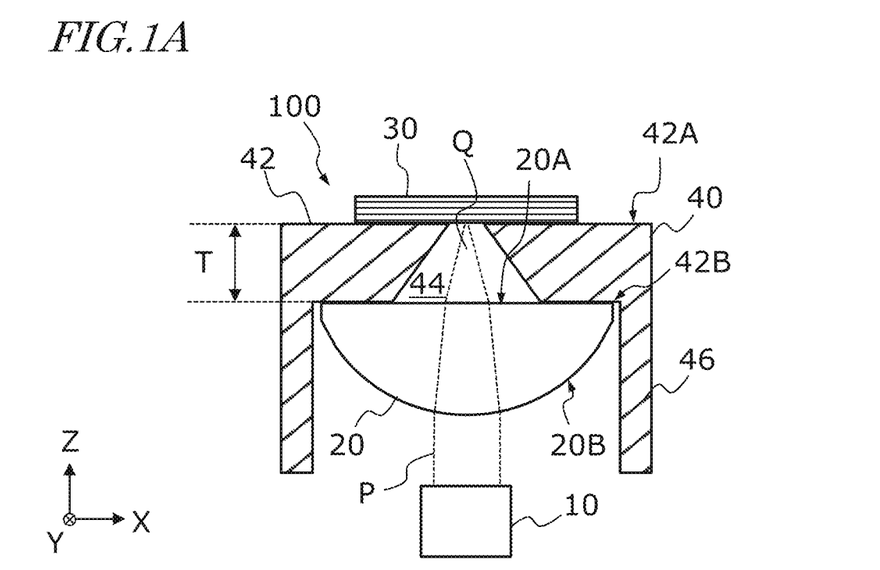
FIG. 1A is a cross-sectional view schematically showing an example configuration of a light emission device 100 according to the present disclosure.
Figure 1B:
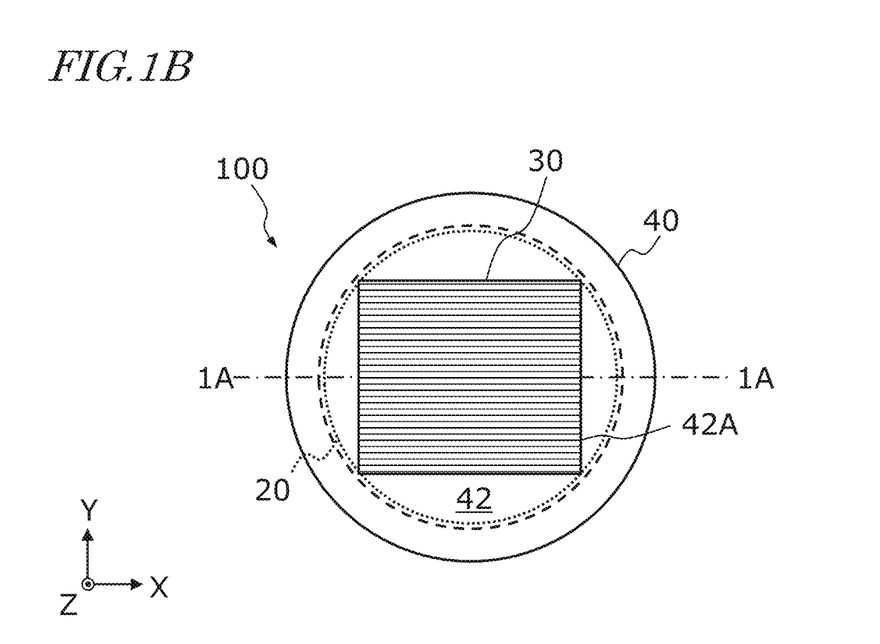
FIG. 1B is a schematic top view of the light emission device 100 according to the present disclosure.

FIG. 1A is a cross-sectional view schematically showing an example configuration of a light emission device 100 according to the present disclosure, and FIG. 1B is a schematic top view thereof. FIG. 1A shows a cross section at line 1A-1A of the light emission device 100 in FIG. 1B. In the attached drawings, the X axis, the Y axis, and the Z axis, which are orthogonal to one another, are schematically shown for reference sake.

As shown in FIG. 1A, the light emission device 100 includes a collimated light source 10, a planoconvex lens 20 configured to converge collimated light P that is emitted from the collimated light source 10 and form a convergent beam Q, an optical member 30 configured to be irradiated with the convergent beam Q, and a housing 40 in which the planoconvex lens 20 is housed.

The collimated light source 10 is a light source that emits the collimated light P. An example of the collimated light source 10 includes at least one light-emitting element to emit light and a lens (hereinafter also referred to as a collimating lens) to collimate light that is radiated from the light-emitting element(s). Examples of light-emitting elements include semiconductor light-emitting elements, such as LEDs (Light Emitting Diodes) and LDs (Laser Diodes). However, without being limited to such examples, the light-emitting element(s) may be a laser device(s) such as a fiber laser(s). The collimated light source 10 may include a waveguide member (e.g., an optical fiber) to propagate light that is radiated from the light-emitting element(s).

The planoconvex lens 20 has a flat surface 20A and a convex curved surface 20B. In the illustrated example, the entire surface of the planoconvex lens 20 through which light exits constitutes the flat surface 20A. A typical example of the convex curved surface 20B is a spherical surface, but it may also be a cylindrical surface. In other words, without being limited to a spherical lens, the planoconvex lens 20 may also be a cylindrical lens. The planoconvex lens 20 may also be an aspherical lens having a curvature that is adjusted to decrease or increase its aberration. So long as the surface of the planoconvex lens 20 through which light exits constitutes the flat surface 20A, the shape of the planoconvex lens 20 is not limited to the illustrated example.

Figure 2:
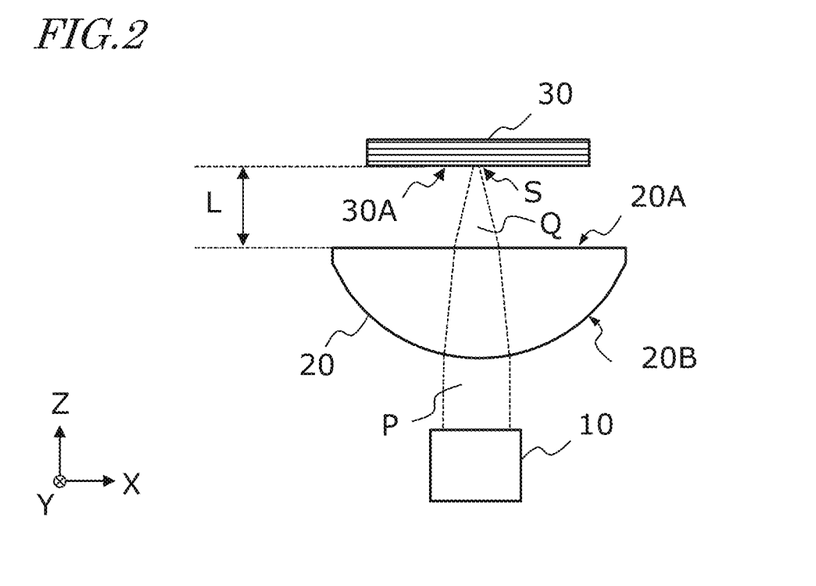
FIG. 2 is a diagram showing a relative positioning between a collimated light source 10, a planoconvex lens 20, and an optical member 30 according to the present disclosure.
Figure 7:
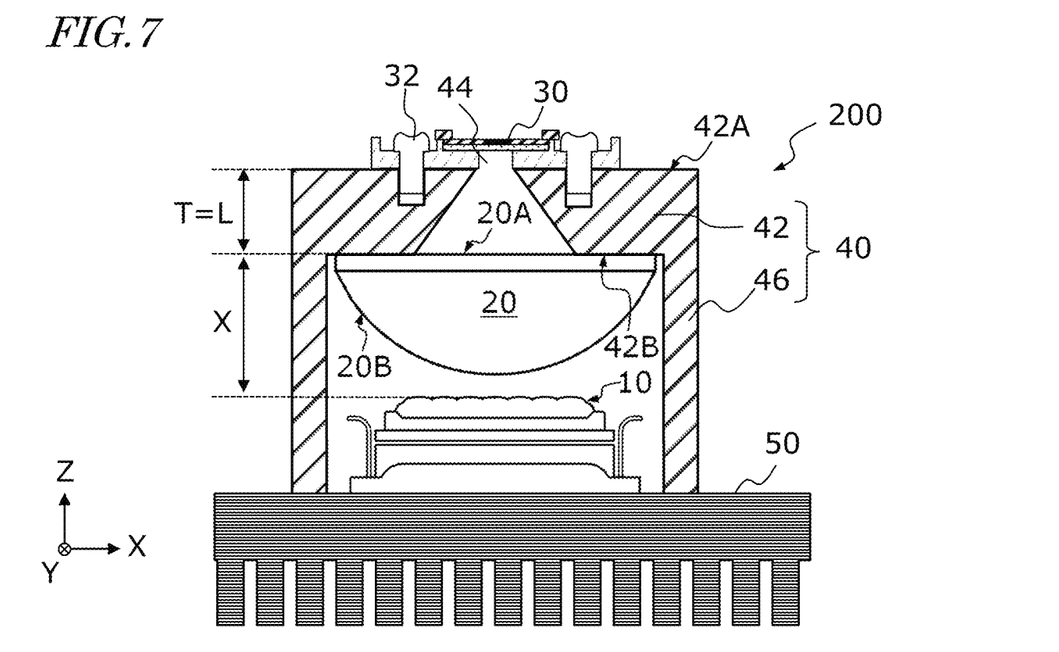
FIG. 7 is a cross-sectional view schematically showing an example configuration of a light emission device 200 according to Embodiment 1 of the present disclosure.

FIG. 2 shows a relative positioning between the collimated light source 10, the planoconvex lens 20, and the optical member 30. For ease of understanding, the housing 40 is omitted from illustration in FIG. 2. On the light incident surface 30A of the optical member 30, the convergent beam Q that has exited the planoconvex lens 20 creates a light spot S. In the present disclosure, a region of the light incident surface 30A of the optical member 30 that is irradiated with the convergent beam Q may be referred to as a "light spot". This light spot may be composed of one or more spots. The light spot may be defined as a region that exhibits an intensity (also referred to as "irradiance" below) that is equal to or above a reference value. This "reference value" may be a value that is $1/e^2$ times the peak intensity value, for example. Herein, e is Napier's constant, which is about 2.72. The shape and size of the light spot S may vary depending on the position of the light incident surface 30A of the optical member 30 relative to the position of the focal point of the planoconvex lens 20. In the present disclosure, a "light incident surface" encompasses not only a physical surface of the optical member 30 on which the convergent beam Q is incident (as shown in FIG. 2), but also a plane of the optical member 30 that is created by a through hole through which the convergent beam Q is allowed to enter (as shown in FIG. 7 below). In other words, a "light incident surface" is inclusive of the plane of a through hole in the optical member 30 through which the convergent beam Q enters. Therefore, the shape and size of the light spot S may mean not only its shape and size when the convergent beam Q is incident on a physical surface of the optical member 30, but also its cross-sectional shape and size when the convergent beam Q enters through a through hole in the optical member 30.

In the present disclosure, the collimated light P does not need to be an ideal Gaussian beam. The collimated light P may be composed of a plurality of Gaussian beams superposed on one another, or a non-Gaussian beam. The intensity distribution in a beam cross section that is perpendicular to the optical axis of the collimated light P does not need to be uni-modal, but may be multi-modal, or have a so-called "top hat" shape.

After the collimated light P is incident on the planoconvex lens 20 and is converted into the convergent beam Q by refractive action of the planoconvex lens 20, the beam cross section has some spread even at the position where a cross-sectional diameter of the convergent beam Q is smallest (i.e., at the position of the focal point in this example). The beam diameter cannot be made any smaller than is possible under the constraints of diffraction (diffraction limit), and may further increase due to a spherical aberration or the like of the planoconvex lens 20. Moreover, as described earlier, the collimated light P according to the present disclosure may have various intensity distributions, and therefore the beam cross section at the focal point may have a complex and varying shape, without being limited to a simple circle or ellipse. Furthermore, the shape and size of the beam cross section may vary at positions even slightly off the focal point. In an embodiment of the present disclosure, the position of the light incident surface 30A of the optical member 30 does not need to coincide with the position of the focal point of the planoconvex lens 20; instead, light may be incident on the light incident surface 30A of the optical member 30 in an off-focus state.

The cross-sectional shape and size of the convergent beam Q differ depending on the position on the optical axis. Therefore, in order to create a light spot of a desired shape and size on the light incident surface 30A of the optical member 30, the relative positioning between the optical member 30 and the planoconvex lens 20 needs to be controlled with a high accuracy.

In the present disclosure, the distance from the optical member 30 to the flat surface 20A of the planoconvex lens 20, or more exactly, the distance from the light incident surface 30A of the optical member 30 to the flat surface 20A of the planoconvex lens 20, is designated as L. If this distance L deviates even slightly from its design value (target value), the distribution of irradiance at the light incident surface 30A of the optical member 30 may significantly fluctuate from the design value, for the aforementioned reason. According to embodiments of the present disclosure, such fluctuations or variations can be suppressed. Details thereof will be described later.

Figure 3:
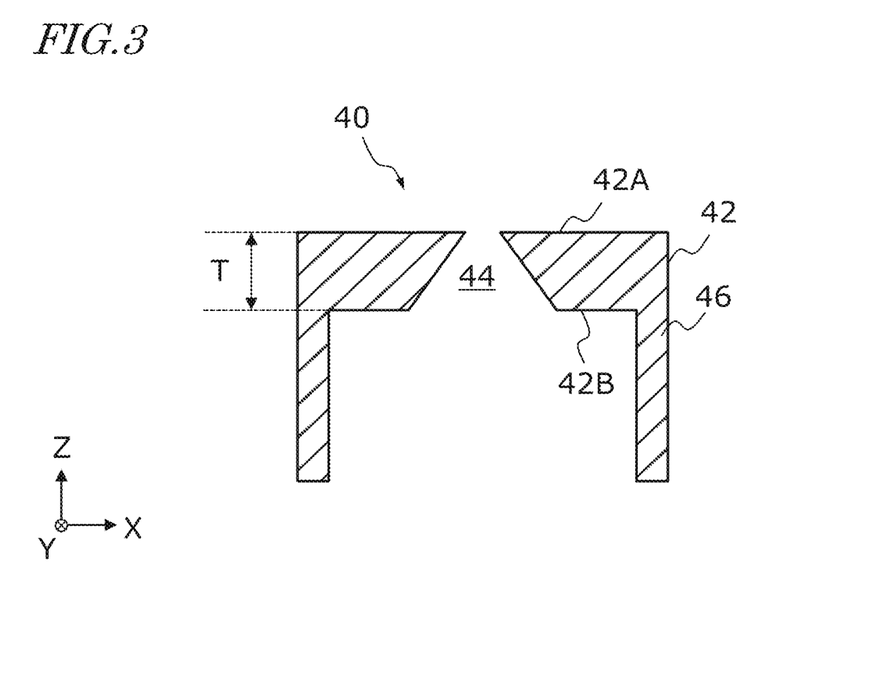
FIG. 3 is a cross-sectional view of a housing 40 according to the present disclosure in a plane that contains a center axis thereof.
Figure 4:
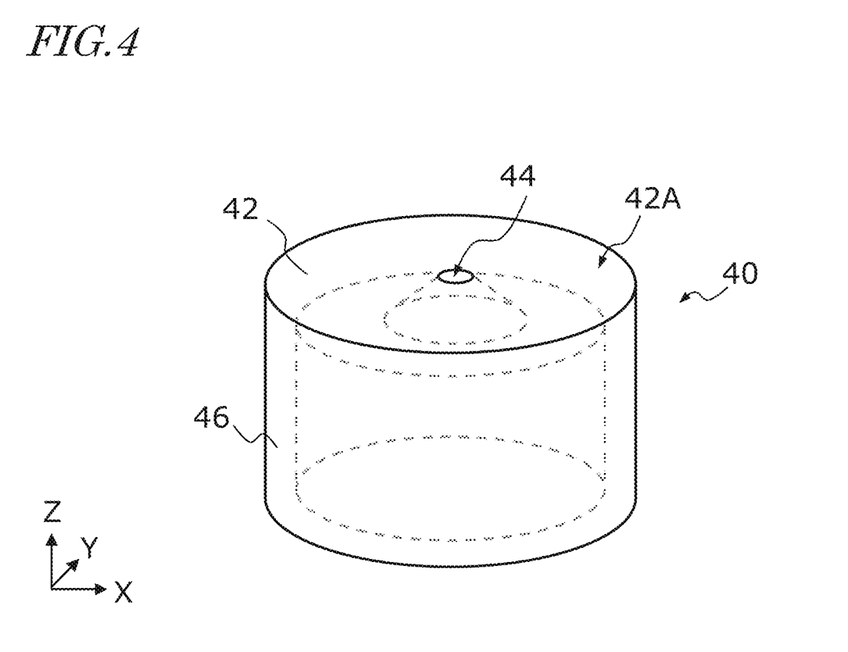
FIG. 4 is a perspective view of the housing 40 according to the present disclosure.

Next, with reference to FIG. 3 and FIG. 4, an example configuration of the housing 40 will be described. FIG. 3 is a cross-sectional view of the housing 40 in a plane that contains a center axis thereof. FIG. 4 is a perspective view of the housing 40. As is illustrated in these figures, the housing 40 includes a lid 42 supporting the optical member 30, such that light having passed through the planoconvex lens 20 is incident on the optical member 30. The lid 42 has a through hole 44 through which the convergent beam Q that has exited the planoconvex lens 20 is allowed to pass. The lid 42 is in contact with at least a portion of the flat surface 20A of the planoconvex lens 20. The lid 42 is in contact with regions of the flat surface 20A of the planoconvex lens 20 other than the region through which the convergent beam Q exits. This allows the convergent beam Q to be incident on the optical member 30. In plan view, the lid 42 is preferably in contact with the flat surface 20A of the planoconvex lens 20 on the inner side of the convex curved surface 20B. This allows the planoconvex lens 20 to be downsized. In other words, in the case in which the planoconvex lens 20 includes a flange (e.g., a portion indicated as "20C" in FIG. 11B) that extends outwards, the lid 42 is preferably in contact with the flat surface 20A in a region that contains the inner side of the flange of the planoconvex lens 20 in plan view. Moreover, the housing 40 includes a sidewall portion 46 that surrounds the perimeter of the planoconvex lens 20. Although the housing 40 shown in these figures has a schematically cylindrical shape, the shape of the housing according to embodiments of the present disclosure is not limited to this example. The outer shape of the housing 40 may schematically be a cube, a rectangular solid, or any other shape.

The lid 42 of the housing 40 has an outer surface 42A, on which the optical member 30 is provided, and an inner surface 42B, which is in contact with at least a portion of the flat surface 20A of the planoconvex lens 20. The lid 42 has a thickness T that is determined by the distance from the outer surface 42A to the inner surface 42B. The thickness T of the lid 42 defines the distance L from the light incident surface 30A of the optical member 30 to the flat surface 20A of the planoconvex lens 20 as shown in FIG. 2.

The thickness T of the lid 42 of the housing 40 may have slight deviations from its design value (dimensional tolerance), owing to manufacturing variations. However, variations in the thickness T of the lid 42 alone are very small in magnitude. On the other hand, in conventional techniques, a plurality of factors may combine to inflict significant fluctuations in the distance L, including, for example, misalignments in attaching the lens to a lens holder, misalignments in attaching the lens holder to a housing or the like, and dimensional errors of the lens holder and the housing. The lid 42 may be composed of two or more parts. Preferably, however, the lid 42 is composed of one monolithic part (one-piece body) in order to suppress variations in the thickness T of the lid 42.

With the light emission device according to the present disclosure, as shown in FIG. 1A, the distance L can be controlled on the basis of the thickness T of the lid 42 alone, thereby reducing the causes for fluctuations in the distance L as compared to conventional techniques. Manufacturing variations in the thickness T depend on the precision of processing, e.g., about 100 µm or less. This allows the shape and size of a light spot on the light incident surface 30A of the optical member 30 to be controlled with a high accuracy. With a light emission device according to the present disclosure, in the case in which the optical member 30 is a phosphor member, for example, it is possible to adjust an irradiance distribution of excitation light that is incident on the phosphor member, thus achieving a desired light spectrum and distribution of emission. Also in the case in which the optical member 30 includes a retention member having a through hole and a phosphor member that is disposed in the through hole, for example, it is possible to adjust an irradiance distribution of excitation light that is incident on the through hole of the retention member, thus achieving a desired light spectrum and distribution of emission. Moreover, when the optical member 30 is an optical fiber, it is possible to accurately converge light on a small-diametered core, thus achieving optical coupling with a high efficiency.

In a light emission device according to the present disclosure, it is collimated light that is incident on the convex curved surface 20B of the planoconvex lens 20, and thus the distance between the collimated light source 10 and the planoconvex lens 20 hardly affects the shape and size of the light spot that the convergent beam Q from the planoconvex lens 20 creates on the light incident surface 30A of the optical member 30.

Furthermore, with a light emission device according to the present disclosure, the thickness T of the lid 42 can be made larger than conventional lid thicknesses. In the case in which the light emission device is used for a headlight of an automobile, the thickness T may be in the range of not less than 3 mm and not more than 80 mm, for example. Because the distance L may take various values depending on the type of light emission device and the application in which the light emission device is employed, the thickness T may also take various values, as can the distance L.

When the thickness T is 3 mm or more, for example, the lid 42 may advantageously be made of a material with high thermal conductivity (e.g., aluminum) so that, even if the optical member 30 becomes heated through irradiation with the convergent beam Q, the heat can be quickly dissipated via the housing 40 to e.g. a heat sink not shown. As the material of the lid 42, a metal material such as a stainless steel or copper may also be used.

As shown in FIG. 3 and FIG. 4, the through hole 44 in this example is shaped so that its aperture area in the outer surface 42A of the lid 42 is smaller than its aperture area in the inner surface 42B. The through hole 44 may have any arbitrary shape so long the shape allows the convergent beam Q to be passed therethrough. The shape of the through hole 44 may be a circular frustum shape, for example. When the aperture area in the outer surface 42A of the lid 42 is made relatively small as in the example illustrated in FIG. 3 and FIG. 4, the lid 42 is allowed to have an increased volume near the optical member 30, thus achieving an effect of enhancing the heat-releasing ability from the optical member 30 while allowing the convergent beam Q to pass through.

Figure 5:
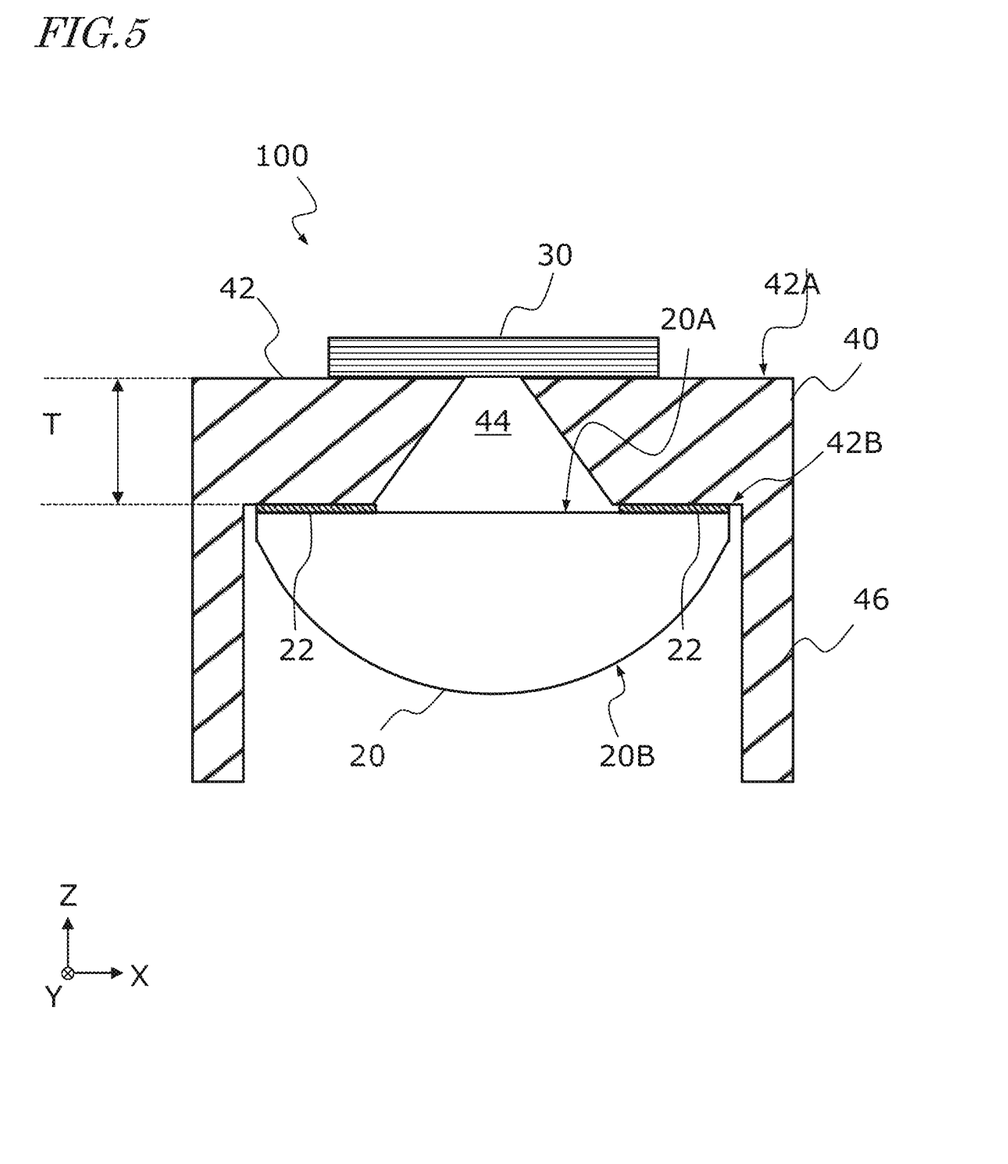
FIG. 5 is a cross-sectional view showing enlarged a portion of the light emission device 100 according to the present disclosure.

FIG. 5 is a cross-sectional view showing enlarged a portion of the light emission device 100 according to the present disclosure. In the example of FIG. 5, an adhesion layer 22 exists between the flat surface 20A of the planoconvex lens 20 and the inner surface 42B of the lid 42. As will be described later, the thickness of the adhesion layer 22 may be very small, e.g. 20 µm or less. Therefore, in any drawings other than FIG. 5, the adhesion layer 22 is omitted from illustration. In the present disclosure, a state in which "the flat surface 20A of the planoconvex lens 20 is in contact with the inner surface 42B of the lid 42" is inclusive of a state in which the flat surface 20A of the planoconvex lens 20 is adhesively bonded to the inner surface 42B of the lid 42 via the adhesion layer 22.

Figure 6A:
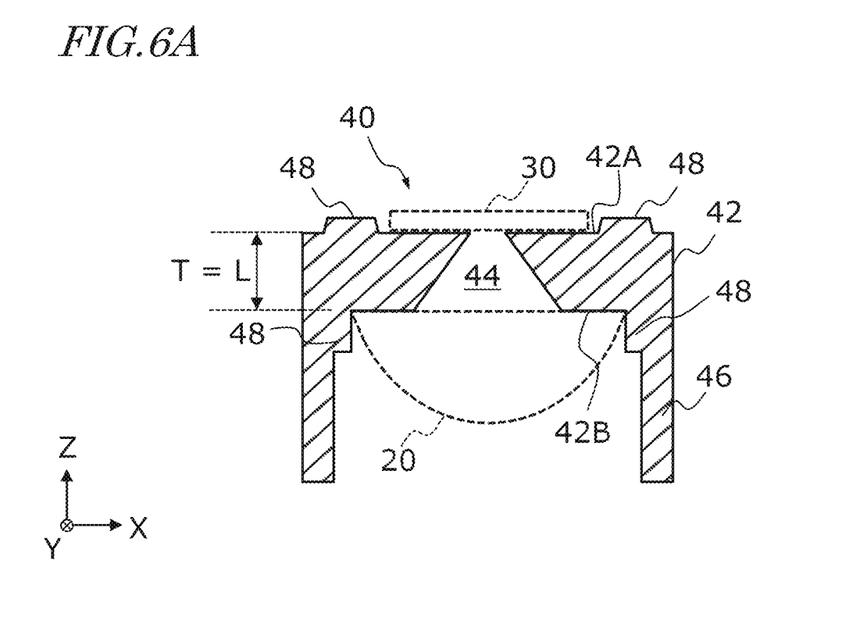
FIG. 6A is a cross-sectional view showing an example where a lid 42 includes additional features.

The lid 42 of the housing 40 may have any additional features besides the portion having the thickness T. FIG. 6A shows an example where the lid 42 includes such additional features. In this example, the lid 42 includes bumps 48 as additional features. Provide correspond the bumps 48 allows the optical member 30 or the planoconvex lens 20 to be positioned relative to the positions of the bumps 48. In the present disclosure, the thickness T of the lid 42 refers to the thickness of a portion that defines the distance L from the light incident surface 30A of the optical member 30 to the flat surface 20A of the planoconvex lens 20. Therefore, presence of the bumps 48 will not affect the thickness T of the lid 42. The bumps 48 may be made of the same material as the material of the lid 42, such that the bumps 48 and the lid 42 constitute an integral component.

Figure 6B:
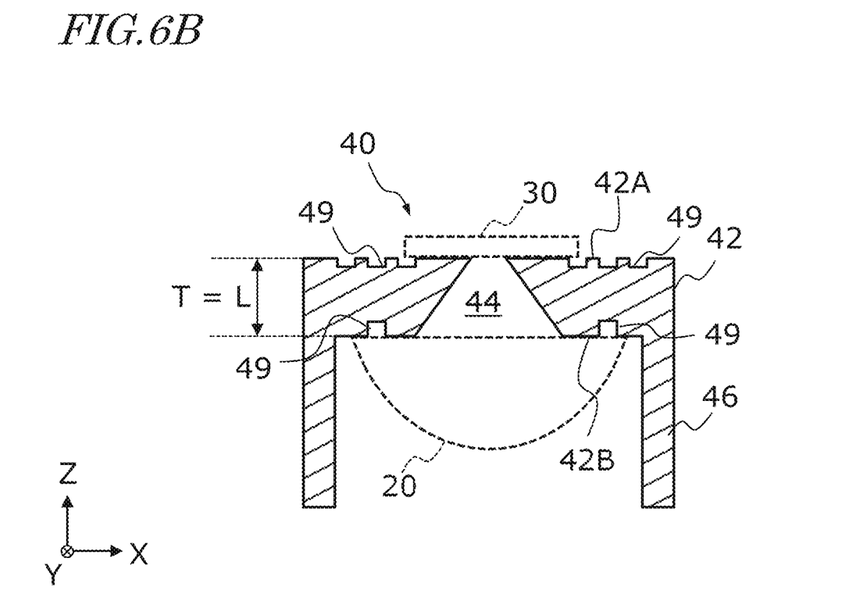
FIG. 6B is a cross-sectional view showing another example where the lid 42 includes additional features.

FIG. 6B shows another example configuration of the lid 42. In this example, the lid 42 includes dents 49, e.g., grooves. Providing the dents 49 has an advantage in that, when the optical member 30 is secured to the lid 42 by using an adhesion layer, for example, the adhesion layer can also go into the dents 49, and thus is restrained from reaching an outer lateral surface of the optical member 30. Moreover, when the planoconvex lens 20 is secured to the lid 42 by using an adhesion layer, the adhesion layer can be restrained from reaching an outer lateral surface of the through hole 44 or the planoconvex lens 20. Presence of such dents 49 will not affect the thickness T of the lid 42, either. When a large difference exists between the coefficients of thermal expansion of the lid 42 and the planoconvex lens 20, the lid 42 may have a structure for relaxing a stress that may exist between the lid 42 and the planoconvex lens 20.

Hereinafter, light emission devices according to specific embodiments of according to the present disclosure will be described.

Embodiment 1

FIG. 7 is a cross-sectional view schematically showing an example configuration of a light emission device 200 Embodiment 1 according to the present disclosure.

The light emission device 200 includes a collimated light source 10, a planoconvex lens 20, an optical member 30, and a housing 40. The basic configurations of the collimated light source 10, the planoconvex lens 20, the optical member 30, and the housing 40 are as described above.

The collimated light source 10 in the present embodiment includes one or more laser diodes (hereinafter simply referred to as "LD") as light-emitting element(s). The planoconvex lens 20 is secured to a lid 42 of the housing 40. Specifically, a flat surface 20A of the planoconvex lens 20 is adhesively bonded to an inner surface 42B of the lid 42 via an adhesion layer. The thickness of the adhesion layer, which expands in layer form between the flat surface 20A of the planoconvex lens 20 and the inner surface 42B of the lid 42, is at the most 100 µm or less, and preferably 20 µm or less. Therefore, variations in the thickness of the adhesion layer can be ignored. The adhesion layer may be made of a resin material that is epoxy-based, acryl-based, silicone-based, or vinyl-based, for example.

On the flat surface 20A of the planoconvex lens 20, a film (not shown) or the like may be formed. So long as the thickness of the film is 10 µm or less, variations thereof are ignorable as are variations in the thickness of the adhesion layer.

The housing 40 includes a sidewall portion 46 that surrounds the perimeter of the planoconvex lens 20. The perimeter of the planoconvex lens 20 may be adhesively bonded to the sidewall portion 46 via an adhesion layer. This will allow the planoconvex lens 20 to be secured more firmly. The housing 40, in which both the planoconvex lens 20 and the collimated light source 10 are housed, is secured to a heat sink 50 that is made of a metal. Details of the collimated light source 10 will be described later.

Figure 8:
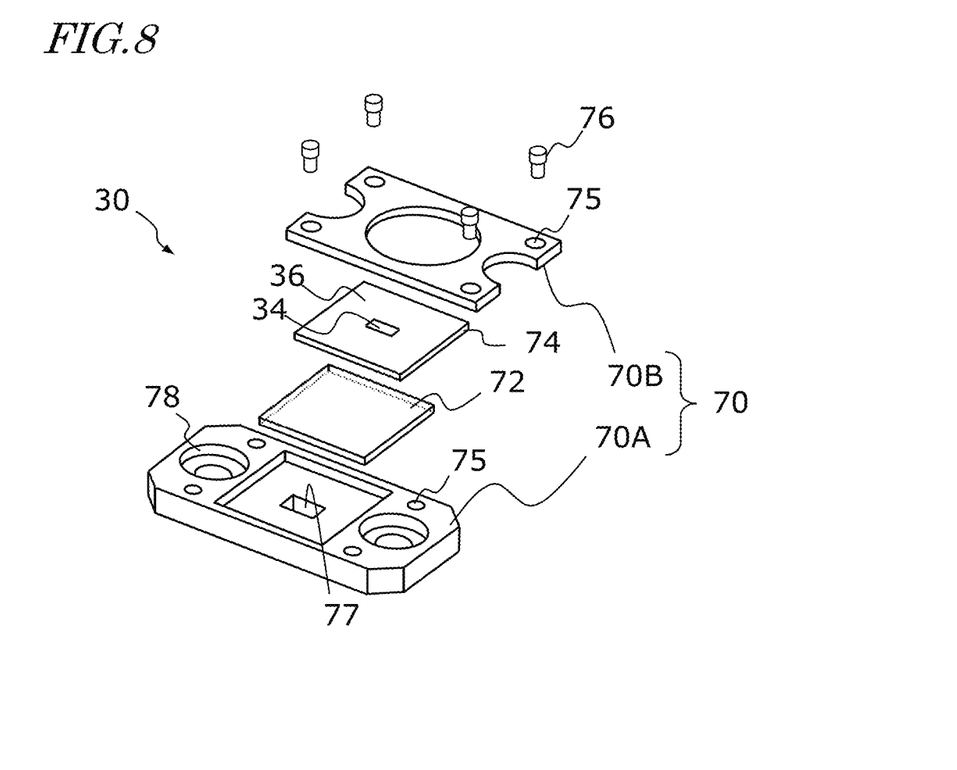
FIG. 8 is a perspective view showing an example configuration of the optical member 30.

As shown in FIG. 8, the optical member 30 includes: a phosphor member 74, a light-transmitting member 72 disposed below the phosphor member 74, and a retention member 70 that retains the phosphor member 74 and the light-transmitting member 72. The phosphor member 74 includes a phosphor region 34 that contains a phosphor, and a light-reflecting region 36 that is located around the phosphor region 34. The phosphor region 34 can function as a light-transmitting region, whereas the light-reflecting region 36 can function as a region that shields light. The light-transmitting member 72 may be a piece of sapphire, for example. The retention member 70 includes: a body portion 70A, above which the light-transmitting member 72 and the phosphor member 74 are disposed; and a hold-down portion 70B that secures the light-transmitting member 72 and the phosphor member 74 to the body portion 70A. The body portion 70A is made of a material having good thermal conductivity, e.g., aluminum or copper. Concentric holes 75 are made in the body portion 70A and the hold-down portion 70B of the retention member 70, such that the body portion 70A and the hold-down portion 70B are secured with screws 76 inserted in the holes 75. The body portion 70A of the retention member 70 has a through hole 77 in the center so that a convergent beam passes through and irradiates the phosphor region 34. The optical member 30 thus structured is secured to the lid 42 of the housing 40 by fixtures 32, e.g., screws, as illustrated in FIG. 7. As shown in FIG. 8, openings 78 to receive the fixtures 32 are made in the body portion 70A of the retention member 70 of the optical member 30. The configuration of the optical member 30 is not limited to the example shown in FIG. 8.

Figure 9:
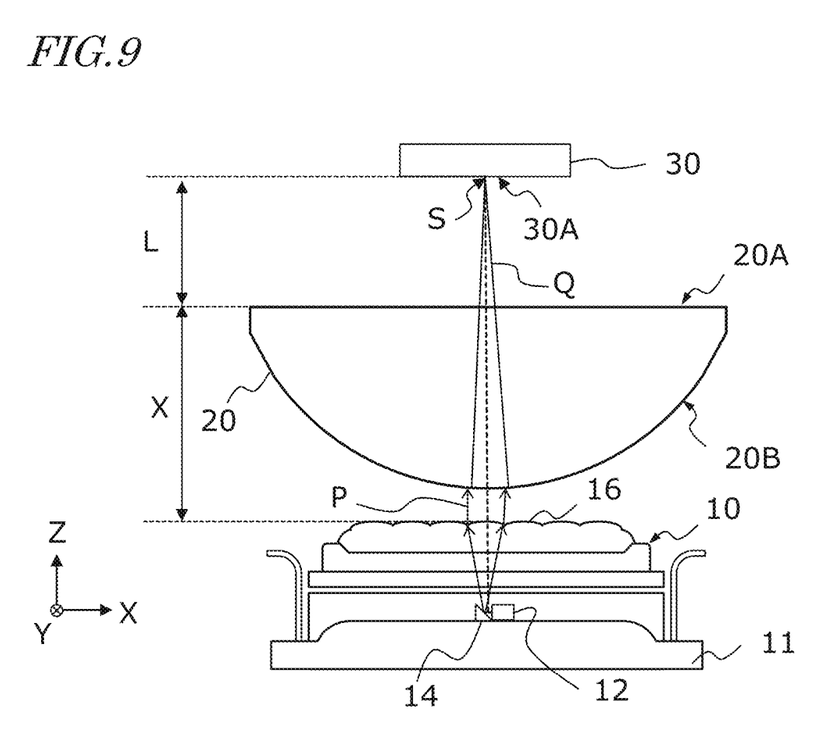
FIG. 9 is a diagram schematically showing a cross section that contains the optical axis of a laser beam exiting the collimated light source 10.

Next, with reference to FIG. 9, a main operation of the light emission device 200 will be described. FIG. 9 is a diagram schematically showing a cross section of the light emission device 200 that contains the optical axis (central axis) of a laser beam exiting the collimated light source 10. For understanding ease, the housing 40 and the heat sink 50 are omitted from illustration in FIG. 9. FIG. 9 shows only one LD 12 among all the light-emitting elements included in the collimated light source 10.

In the example shown in FIG. 9, a laser beam that is emitted from the LD 12 in the negative direction of the X axis, while diverging, irradiates a mirror 14. A far field pattern of the laser beam has a substantially elliptical cross-sectional shape. The laser beam having been reflected by the mirror 14 in the positive direction of the Z axis is incident on the collimating lens 16. The collimating lens 16 collimates the laser beam, thus generating collimated light P. The collimated light P is incident on the convex curved surface 20B of the planoconvex lens 20, and exits from the flat surface 20A. When passing through the planoconvex lens 20, the collimated light P is converged by refractive action of the planoconvex lens 2, thus being converted into a convergent beam Q.

The convergent beam Q that has exited the planoconvex lens 20 is incident on the optical member 30. In the present embodiment, the distance L from the light incident surface 30A of the optical member 30 to the flat surface 20A of the planoconvex lens 20 is equal to the thickness T of the lid 42 shown in FIG. 7. FIG. 9 also shows a distance X from the flat surface 20A of the planoconvex lens 20 to the collimated light source 10. Because the bundle of rays constituting the collimated light P are substantially parallel to one another, the state of the collimated light P being incident on the convex curved surface 20B of the planoconvex lens 20 is hardly affected by the distance X. Therefore, even if the distance X fluctuates because of manufacturing variations, the shape and size of a light spot that is created on the light incident surface 30A of the optical member 30 by the convergent beam Q are hardly affected.

Although FIG. 9 illustrates one LD 12 disposed on a substrate 11 of the collimated light source 10, the collimated light source 10 may include a plurality of LDs 12. Note that the collimated light source 10 according to the present embodiment is hermetically sealed in order to suppress degradation of a light emitting face of the LD 12, etc., through dust collection. Such a collimated light source 10 is referred to as a laser package.

Next, with reference to FIG. 10A through 10C, an example will be described where the collimated light source 10 includes a plurality of LDs 12.

Figure 10A:
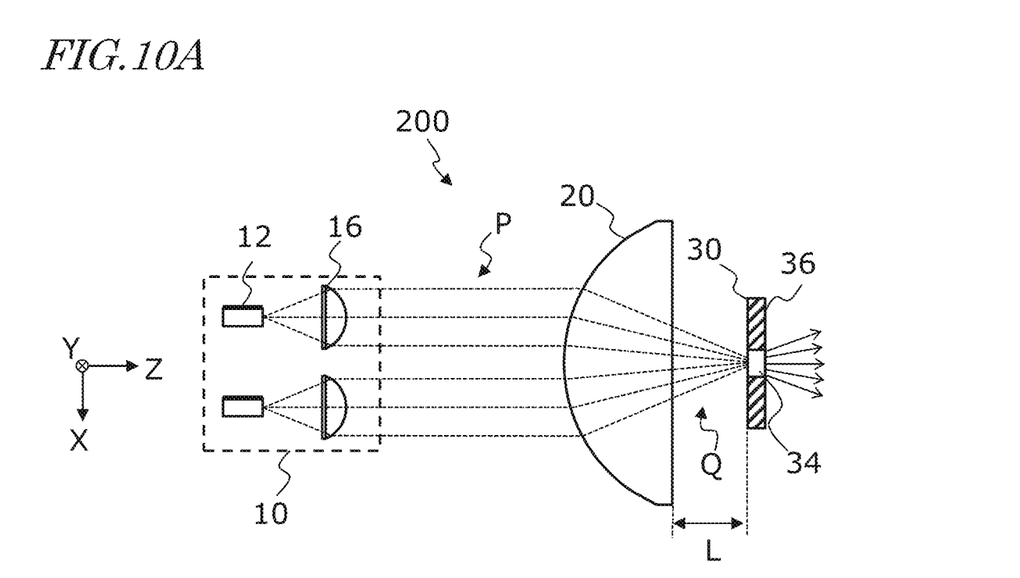
FIG. 10A is a cross-sectional view schematically showing rays in a plane that is parallel to an XZ plane of the light emission device 200.
Figure 10B:
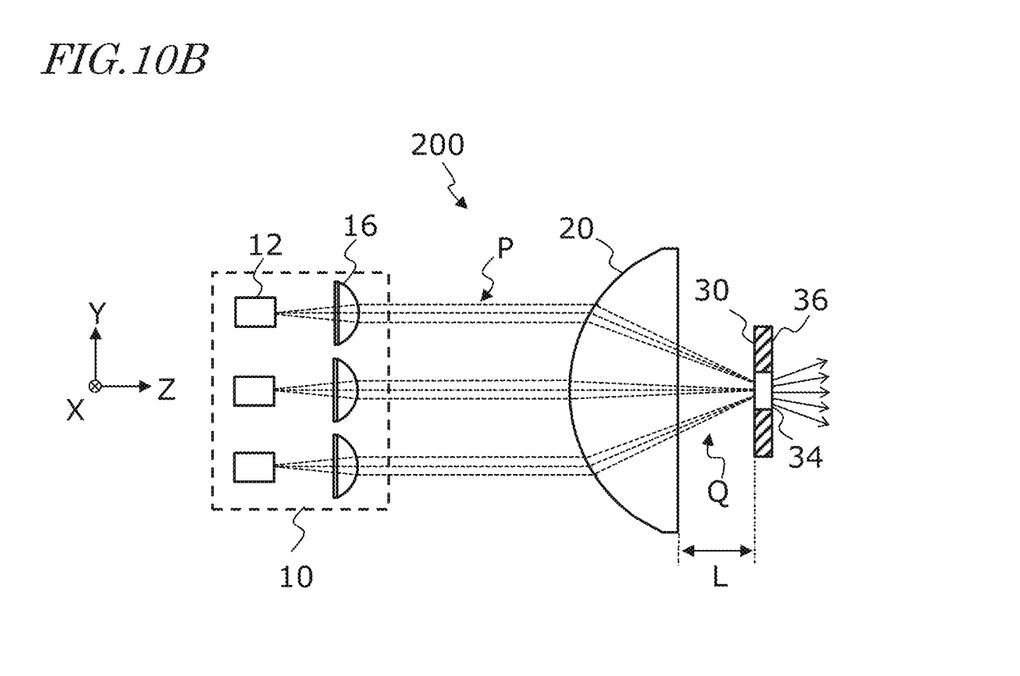
FIG. 10B is a cross-sectional view schematically showing rays in a plane that is parallel to an YZ plane of the light emission device 200.

First, FIG. 10A and FIG. 10B are referred to. FIG. 10A is a cross-sectional view schematically showing rays in a plane that is parallel to the XZ plane of the light emission device 200, and FIG. 10B is a cross-sectional view schematically showing rays in a plane that is parallel to the YZ plane of the light emission device 200. In this example, for understanding ease, the mirrors are omitted from illustration, as if laser light emitted from the LDs 12 were straightforwardly incident on the collimating lens 16. In the illustrated example, six LDs 12 are arranged in two rows and three columns within a plane that is parallel to the XY plane. Therefore, in a strict sense, the collimated light P consists of six collimated beams. In other words, as the collimated light P, the collimated light source 10 in this example emits a plurality of collimated beams that are parallel to one another. Without being limited to six, the number of LDs 12 may be five or smaller, or seven or greater. The plurality of LDs 12 do not need to be arranged in rows and columns, but may be disposed in concentric circles, or disposed at inconstant intervals. Although the example of FIG. 10A and FIG. 10B illustrates the six collimating lenses 16 to be distinct optical elements, a single lens array including a plurality of collimating lens portions may instead be employed. This will allow the collimated light source 10 and/or the housing 40 to be downsized.

The laser light emitted from each LD 12 diverges at a greater angle in a direction parallel to the X axis than in a direction parallel to the Y axis. Therefore, a cross section of each collimated beam exiting the collimating lens 16 can be approximated as an ellipse having a major axis along the X axis direction and a minor axis along the Y axis direction. The beam cross section may be defined on the basis of a value that is equal to $1/e^2$ times the peak intensity value, for example.

Figure 10C:
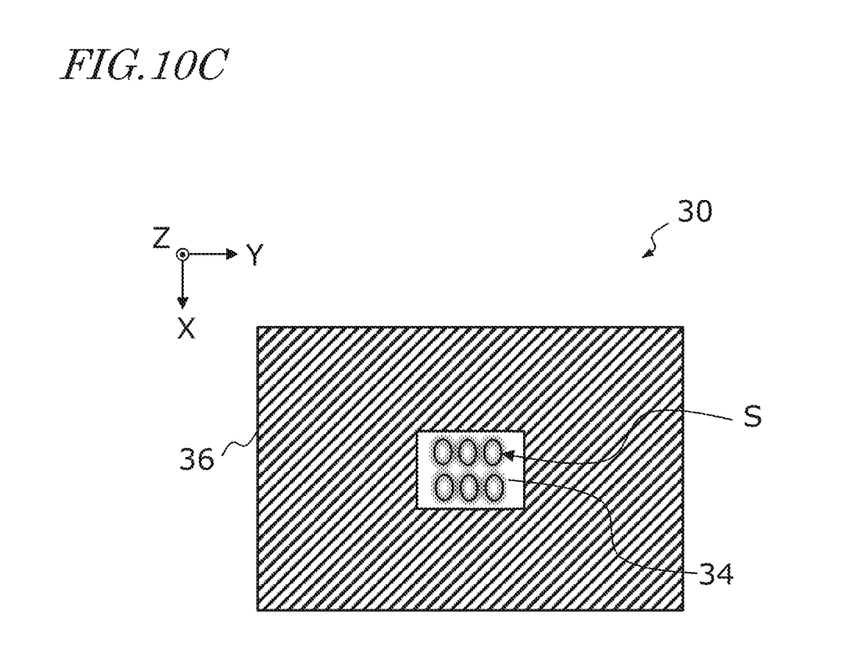
FIG. 10C is a plan view schematically an example configuration of the optical member 30.

FIG. 10C is referred to next. FIG. 10C is a plan view schematically an example configuration of the optical member 30.

In the example of FIG. 10C, the optical member 30 includes a phosphor region 34 and a light-reflecting region 36 that is located around the phosphor region 34. In the light emission device 200, the LDs 12 function as excitation light sources. The phosphor region 34 of the optical member 30 absorbs a portion of the excitation light and emits fluorescence. The peak wavelengths of the LDs 12 according to the present embodiment may be in the range of not less than 350 nm and not more than 600 nm. Preferably, the peak wavelengths of the LDs 12 may be in a blue band, e.g., in the range of not less than 445 nm and not more than 465 nm. The phosphor region 34 contains a phosphor, and functions as a wavelength-converting portion. Examples of phosphors may include at least one of a YAG phosphor, a LAG phosphor, a TAG phosphor, an αSiAlON phosphor, an βSiAlON phosphor, and a CASN. These phosphors absorb blue excitation light and emit yellow, green, orange, or red fluorescence. The light-reflecting region 36 may be made of a light-reflective ceramic that contains aluminum oxide, zirconium oxide, titanium dioxide, yttrium oxide, or the like, for example. The light-reflecting region 36 causes the fluorescence and excitation light that are radiated or scatter from inside of the phosphor region 34 to be reflected toward the phosphor region 34.

Below (i.e., at the rear face side of) the phosphor region 34, a band-pass filter against fluorescence may be provided. This band-pass filter may be made of e.g. a multilayer film of dielectric, and has wavelength selectivity. The refractive index and thickness of the dielectric layers are adjusted so that the multilayer film of dielectric transmits laser light that is emitted from the LDs 12 but reflects any fluorescence that occurs in the phosphor region 34. The optical member 30 may include any other light-shielding member, a transparent cover, and/or like elements.

FIG. 10C schematically shows an example pattern of light spots S that may be created by the convergent beam Q on the light incident surface 30A of the optical member 30, i.e., at the rear face side of the phosphor region 34. In this example, the rear face side of the phosphor region 34 is at a position that is not at or near the focal point of the convergent beam Q. In other words, the rear face side of the phosphor region 34 is not located at the rear side focal point of the planoconvex lens 20 ("off-focus state"). As a result, a wide range of the phosphor region 34 may be irradiated with excitation light. The phosphor region 34 as projected on a plane that is parallel to the XY plane may be sized so that each of its longer sides is 2 mm long and each of its shorter sides is 1 mm long, for example. By irradiating the phosphor region 34 of this size with a plurality of convergent beams, light with high radiance can be obtained. Because laser light is thus incident on a narrow region at high irradiance, the temperature of the phosphor region 34 may become as high as e.g. 300° C. during operation. In the present embodiment, the lid 42 of the housing 40 is made of a piece of metal or ceramic having a thickness of e.g. about 10 to 30 mm, and therefore a high thermal resistance and heat-releasing ability can be attained.

In the light emission device 200 according to the present embodiment, fluorescence that was radiated from the phosphor region 34 and excitation light that was not absorbed by the phosphor region 34 (but was rather transmitted through the phosphor region 34) are mixed, whereby so-called "white light" is generated.

The example shown in FIG. 10C, a light spot S, which includes a plurality of spots, is created at the rear face side of the phosphor region 34. In the case in which the convergent beam Q is in an off-focus state at the phosphor region 34 or like cases, however, the plurality of spots may overlap one another such that they are not distinguishable as individual spots. In order to attain convergence onto a narrower region and hence a higher optical density, the thickness T of the lid 42 of the housing 40 may be designed so as to realize an on-focus state.

According to the present embodiment, the shape and size of the light spot(s) S that is created on the phosphor region 34 are not likely to vary individually from light emission device to light emission device, for the above-described reasons. Thus, target emission characteristics can be realized with a good yield. Note that the light that is emitted from the phosphor region 34 does not need to be white light. Without being limited to a blue band, the wavelength of excitation light may be in a violet band or an ultraviolet band.

Embodiment 2

Figure 11A:
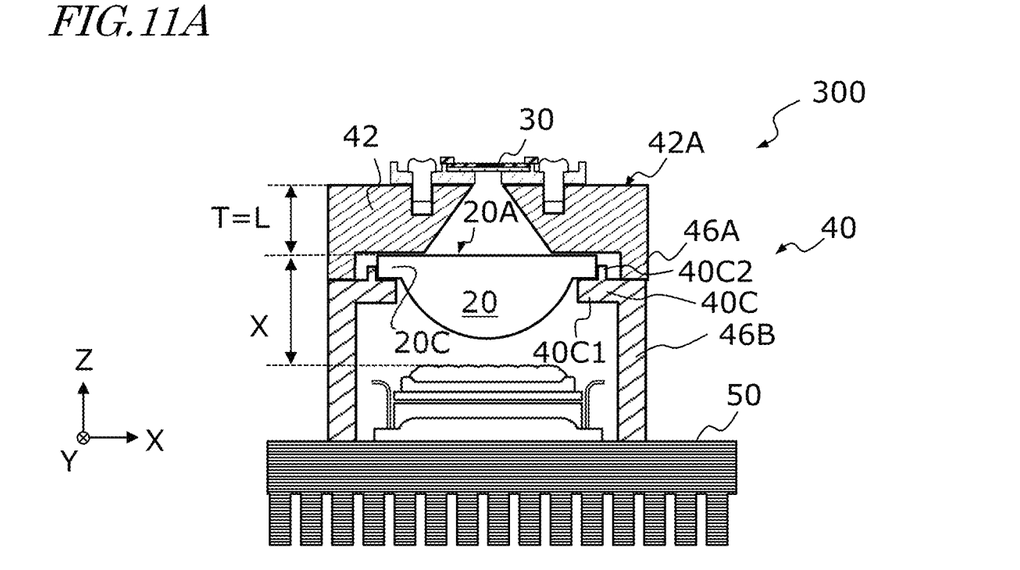
FIG. 11A is a cross-sectional view schematically showing an example configuration of a light emission device 300 according to Embodiment 2 of the present disclosure.
Figure 11B:
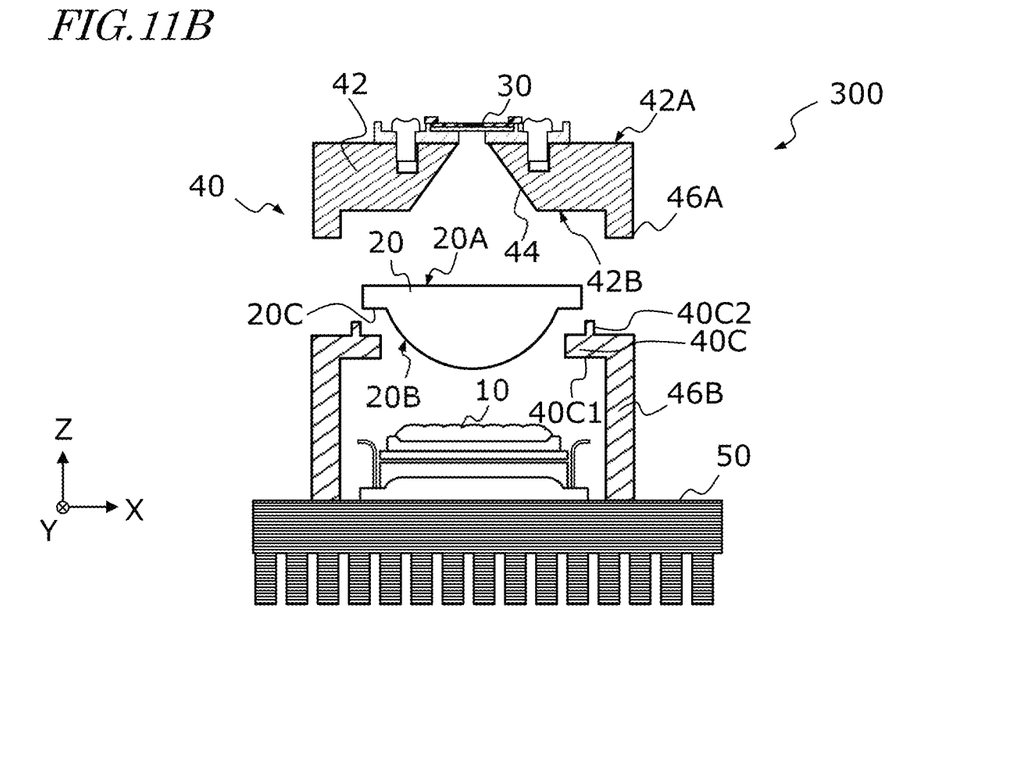
FIG. 11B is a cross-sectional view showing some of the constituent elements of the light emission device 300 as isolated from one another.

FIG. 11A is a cross-sectional view schematically showing an example configuration of a light emission device 300 according to Embodiment 2 of the present disclosure. FIG. 11B is a cross-sectional view showing some of the constituent elements of the light emission device 300 as isolated from one another.

The basic configuration of the light emission device 300 is similar to the configuration of the light emission device 200 described above. A first difference is that the housing 40 includes sidewall portions 46A and 46B that surround the perimeter of the planoconvex lens 20, and that the sidewall portion 46B, which is located below the sidewall portion 46A, includes a protrusion 40C that is in contact with at least a portion of the convex curved surface 20B side of the planoconvex lens 20. As used herein, the "convex curved surface 20B side" means the side of the planoconvex lens 20 that is opposite to the side on which the flat surface 20A is located. A second difference is that there exists a flange 20C extending outwardly in the XY plane from a portion (which may resemble a partial sphere) of the planoconvex lens 20 that forms the convex curved surface 20B. The planoconvex lens 20 is secured by the lid 42 and the protrusion 40C of the sidewall portion 46B. More specifically, the flat surface 20A of the planoconvex lens 20 is in contact with the inner surface 42B of the lid 42, whereas the flange 20C is in contact with the protrusion 40C of the sidewall portion 46.

As shown in FIG. 11A and FIG. 11B, the protrusion 40C of the sidewall portion 46B includes an inner protrusion 40C1 that protrudes inwardly toward the planoconvex lens 20 and an upper protrusion 40C2 that protrudes further upward from a portion of the inner protrusion 40C1. The upper protrusion 40C2 protrudes upward from a position that is away from an inner side surface of the inner protrusion 40C1 such that the flange 20C is in contact with a portion of the inner protrusion 40C1. An upper surface of the inner protrusion 40C1 is in contact with the flange 20C. At least a portion of a side surface of the upper protrusion 40C2 surrounding the flange 20C is in contact with the flange 20C. Specifically, the upper surface of the inner protrusion 40C1 is in contact with a side of the flange 20C that faces toward the convex curved surface of the planoconvex lens 20. Moreover, at least a portion of the side surface of the upper protrusion 40C2 surrounding the flange 20C is in contact with a side surface of the flange 20C.

As shown in FIG. 11B, the planoconvex lens 20 is sandwiched by two portions composing the housing 40, from above and from below. This allows the planoconvex lens 20 to be secured to the housing 40 even without using an adhesion layer. Connection and securing of the upper sidewall portion 46A and the lower sidewall portion 46B can be achieved by screws, welding, press-fit, or the like, for example. Note that an adhesion layer may be employed in conjunction with the above-described method to secure the planoconvex lens 20 to the housing 40.

Thus, the housing 40 may take a variety of configurations. What is important is that even though the housing 40 is separable into a plurality of parts, the flat surface 20A of the planoconvex lens 20 is nonetheless in contact with the flat inner surface 42B of the lid 42 of the housing 40. With such configuration, the shape and size of a light spot S to be created on the phosphor region 34 are not likely to vary individually from light emission device to light emission device, so that target emission characteristics can be realized with a good yield.

With a light emission device according to the present disclosure, a convergent beam can achieve a desired irradiance distribution on the optical member 30 with a good reproducibility. Without being limited to a wavelength conversion element containing a phosphor, the optical member 30 may be an optical fiber, a lens, or the like.

As shown in FIG. 11B, manufacturing of the light emission device 300 can be facilitated by the configuration where the planoconvex lens 20 is sandwiched by the inner surface 42B of the lid 42 of the housing 40 and another portion of the housing 40 (e.g., the protrusion 40C of the sidewall portion 46B). As compared to the case in which the planoconvex lens 20 is secured to the lid 42 by using an adhesion layer or the like, it is possible to improve on thermal resistance, vibration resistance, shock resistance, and thermal shock resistance. Furthermore, the lid 42 can easily be detached from the housing 40, thus facilitating exchange of the planoconvex (or any other type of) lens 20, for example. This effect can also be achieved by using another type of light source (non-collimated light source) instead of the collimated light source 10. A typical example of a "non-collimated light source" may be a light source that radiates divergent light, e.g., an LED. Moreover, a "non-collimated light source" is inclusive of light sources that emit a convergent beam and light sources that emit a divergent beam.

Embodiment 3

Figure 12:
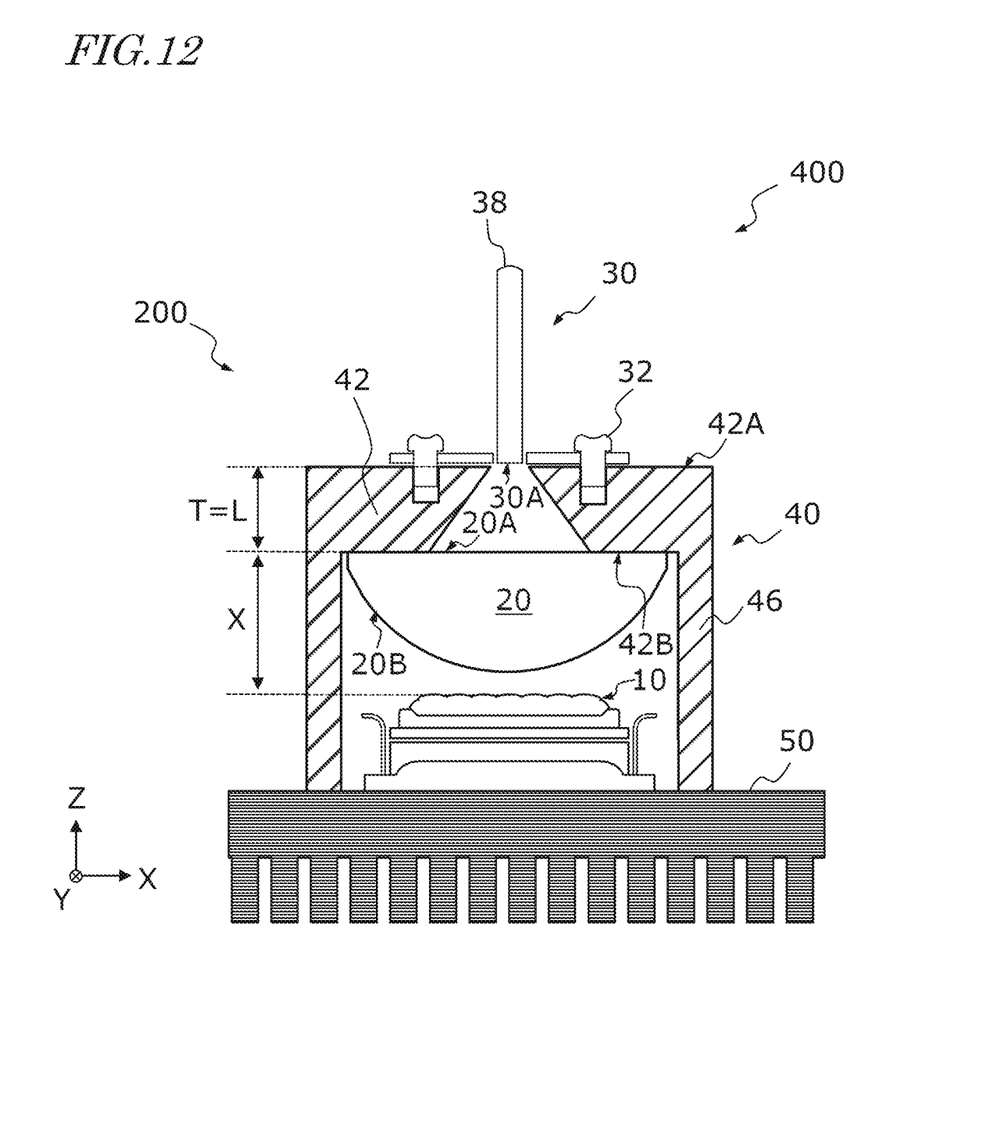
FIG. 12 is a cross-sectional view schematically showing an example configuration of a light emission device 400 according to Embodiment 3 of the present disclosure.

FIG. 12 is a cross-sectional view schematically showing an example configuration of a light emission device 400 according to Embodiment 3 of the present disclosure. The basic configuration of the light emission device 400 is similar to the configuration of the light emission device 200 described above, except for the configuration of the optical member 30. The optical member 30 of the light emission device 400 has an optical fiber package 38 that includes an optical fiber 38A, a ferrule 38B, and a cylindrical metal junction 38C. A convergent beam from the planoconvex lens 20 is incident on a light-entering end face (light incident surface 30A) of the optical fiber 38A.

In order to enhance the degree of optical coupling with the optical fiber 38A, unlike in the context of irradiating the phosphor region 34, it is desirable to achieve an on-focus state to keep the light spot size as small as possible.

Thus, according to embodiments of the present disclosure, a desired convergence state can be achieved for various optical members, with little variation.

Each embodiment described above is an exemplary illustration of a light emission device that embodies the technological concept of the present invention. However, the present invention is not limited to the described embodiments. The present disclosure is not intended to limit any member that is recited in the claims to a member in an embodiment. Unless otherwise specified, the dimensions, materials, shapes, relative positioning, etc., of the component parts described in each embodiment are mere examples for explanation purposes, rather than limiting the scope of the present invention. The elements constituting the present invention may be implemented in such a manner that a plurality of elements are composed of the same single member that serves as the plurality of elements, or that the functions of one member are split among a plurality of members.

Light emission devices according to embodiments of the present disclosure are applicable to various laser light sources, e.g., a headlight for vehicles such as an automobile, a light source of a projector, a light source for an endoscope, a pumping light source for a solid laser, a light source of a direct laser device, and the like.

What is claimed is:

1. An optical member comprising:
a body portion having an upper surface that includes an inner first surface portion and a second surface portion, wherein:
a height of the second surface portion is greater than a height of the inner first surface portion, and
in a plan view, the second surface portion surrounds the inner first surface portion;
a phosphor member disposed above the inner first surface portion; and
a hold-down portion configured to secure the phosphor member such that the phosphor member is interposed between the hold-down portion and the body portion;
wherein, in a plan view, two or more openings are located in the body portion at positions outward of the inner first surface portion.

2. The optical member of claim 1, further comprising a light-transmitting member disposed on the inner first surface portion and interposed between the body portion and the phosphor member.

3. The optical member of claim 2, wherein:
the body portion has a through-hole that is surrounded by the inner first surface portion in a plan view; and
the light-transmitting member is disposed so as to close the through-hole.

4. The optical member of claim 2, wherein the light-transmitting member comprises sapphire.

5. The optical member of claim 4, wherein the phosphor member comprises a ceramic.

6. The optical member of claim 1, wherein:
the phosphor member includes a phosphor region, and a light-reflecting region that surrounds the phosphor region in a plan view; and
the hold-down portion is in contact with the light-reflecting region but not in contact with the phosphor region.

7. The optical member of claim 1, further comprising:
a plurality of screws configured to secure the hold-down portion to the body portion; wherein:
in a plan view, in the second surface portion, a first plurality of screw holes are located in the body portion; and
a second plurality of screw holes are located in the hold-down portion.

8. The optical member of claim 1, wherein:
the upper surface of the body portion include outer first surface portions,
the height of the second surface portion is greater than heights of the outer first surface portions,
the second surface portion surrounds the outer first surface portions, and
the two or more openings are in the outer first surface portions.

9. A light emission device comprising:
a light source;
a body portion having an upper surface that includes an inner first surface portion and a second surface portion, wherein:
a height of the second surface portion is greater than a height of the inner first surface portion, and
in a plan view, the second surface portion surrounds the inner first surface portion; and
a phosphor member disposed above the inner first surface portion and configured to receive light emitted from the light source; and
a hold-down portion configured to secure the phosphor member such that the phosphor member is interposed between the hold-down portion and the body portion;
wherein, in a plan view, two or more openings are located in the body portion at positions outward of the inner first surface portion.

10. The light emission device of claim 9, wherein:
the body portion has a through-hole that is surrounded by the inner first surface portion in a plan view;
the light source is located below the body portion; and
the light source is configured to emit light through the is incident on through-hole and onto the phosphor member.

11. The light emission device of claim 10, further comprising:
a light-transmitting member disposed on the inner first surface portion so as to close the through-hole, the light-transmitting member being interposed between the body portion and the phosphor member;
wherein the light source is hermetically sealed.

12. The light emission device of claim 11, wherein the phosphor member comprises a ceramic.

13. The light emission device of claim 11, wherein the light-transmitting member comprises sapphire.

14. The optical member of claim 11, wherein:
the body portion has a through-hole that is surrounded by the inner first surface portion in a plan view; and
the light-transmitting member is disposed so as to close the through-hole.

15. The optical member of claim 9, wherein:
the phosphor member includes a phosphor region, and a light-reflecting region that surrounds the phosphor region in a plan view; and
the hold-down portion is in contact with the light-reflecting region but not in contact with the phosphor region.

16. The optical member of claim 9, further comprising:
a plurality of screws configured to secure the hold-down portion to the body portion;
wherein, in a plan view, in the second surface portion, a first plurality of screw holes are located in the body portion; and
a second plurality of screw holes are located in the hold-down portion.

17. The optical member of claim 9, wherein:
the upper surface of the body portion include outer first surface portions,
the height of the second surface portion is greater than heights of the outer first surface portions,
the second surface portion surrounds the outer first surface portions, and
the two or more openings are in the outer first surface portions.

18. An optical member comprising:
a body portion having an upper surface that includes an inner first surface portion and a second surface portion, wherein:
a height of the second surface portion is greater than a height of the inner first surface portion,
in a plan view, the second surface portion surrounds the inner first surface portion, and
a phosphor member disposed above the inner first surface portion;

a hold-down portion configured to secure the phosphor member such that the phosphor member is interposed between the hold-down portion and the body portion;
a plurality of screws configured to secure the hold-down portion to the body portion; wherein:
in a plan view, in the second surface portion, a first plurality of screw holes are located in the body portion; and
a second plurality of screw holes are located in the hold-down portion.

19. The optical member of claim 18, wherein:
the upper surface of the body portion include outer first surface portions,
the height of the second surface portion is greater than heights of the outer first surface portions,
the second surface portion surrounds the outer first surface portions, and
the two or more openings are in the outer first surface portions.

\* \* \* \* \*

UNITED STATES PATENT AND TRADEMARK OFFICE
CERTIFICATE OF CORRECTION

| | |
|---|---|
| PATENT NO. | : 11,499,695 B2 |
| APPLICATION NO. | : 17/355942 |
| DATED | : November 15, 2022 |
| INVENTOR(S) | : Akinori Hara |

It is certified that error appears in the above-identified patent and that said Letters Patent is hereby corrected as shown below:

In the Claims

Claim 9, Column 14, Line 11:
Please delete:
"first surface portion ."
Please replace with:
"first surface portion."

Claim 10, Column 14, Lines 16-18:
Please delete:
"the light source is configured to emit light through the is incident on through-hole and onto the phosphor member."
Please replace with:
"the light source is configured to emit light through the through-hole and onto the phosphor member."

Signed and Sealed this
Seventh Day of March, 2023

Katherine Kelly Vidal
*Director of the United States Patent and Trademark Office*